(12) United States Patent
Pupovac et al.

(10) Patent No.: US 10,899,925 B2
(45) Date of Patent: Jan. 26, 2021

(54) SCRATCH-RESISTANT POLYCARBONATE COMPOSITIONS HAVING GOOD THERMAL STABILITY

(71) Applicant: Covestro Deutschland AG, Leverkusen (DE)

(72) Inventors: Kristina Pupovac, Düsseldorf (DE); Hans-Jürgen Klankers, Leverkusen (DE)

(73) Assignee: Covestro Deutschland AG, Leverkusen (DE)

(*) Notice: Subject to any disclaimer, the term of this patent is extended or adjusted under 35 U.S.C. 154(b) by 67 days.

(21) Appl. No.: 16/318,420

(22) PCT Filed: Jul. 21, 2017

(86) PCT No.: PCT/EP2017/068528
§ 371 (c)(1),
(2) Date: Jan. 17, 2019

(87) PCT Pub. No.: WO2018/015557
PCT Pub. Date: Jan. 25, 2018

(65) Prior Publication Data
US 2019/0225796 A1 Jul. 25, 2019

(30) Foreign Application Priority Data
Jul. 22, 2016 (EP) .................................. 16180715

(51) Int. Cl.
*C08L 69/00* (2006.01)
(52) U.S. Cl.
CPC ......... *C08L 69/00* (2013.01); *C08L 2205/025* (2013.01); *C08L 2205/035* (2013.01); *C08L 2207/53* (2013.01)
(58) Field of Classification Search
None
See application file for complete search history.

(56) References Cited

U.S. PATENT DOCUMENTS

| | | |
|---|---|---|
| 3,553,167 A | 1/1971 | Schnell et al. |
| 3,644,574 A | 2/1972 | Jackson, Jr. et al. |
| 3,692,744 A | 9/1972 | Rich et al. |
| 4,013,613 A | 3/1977 | Abolins et al. |
| 4,075,173 A | 2/1978 | Maruyama et al. |
| 4,156,069 A | 5/1979 | Prevorsek et al. |
| 4,176,224 A | 11/1979 | Bier et al. |
| 4,269,964 A | 5/1981 | Freitag et al. |
| 4,311,823 A | 1/1982 | Imai et al. |
| 4,334,053 A | 6/1982 | Freitag et al. |
| 4,937,285 A | 6/1990 | Wittmann et al. |
| 4,982,014 A | 1/1991 | Freitag et al. |
| 2008/0132617 A1 | 6/2008 | Eckel et al. |
| 2014/0356551 A1* | 12/2014 | Thulke ................... C08L 69/00 427/576 |
| 2018/0194926 A1* | 7/2018 | Samisch .................. C08K 3/38 |

FOREIGN PATENT DOCUMENTS

| | | |
|---|---|---|
| CA | 1173998 A | 9/1984 |
| CN | 105176037 A | 12/2015 |
| DE | 1900270 A1 | 11/1969 |
| DE | 2035390 A1 | 1/1971 |
| DE | 1495626 B1 | 6/1971 |
| DE | 2248242 A1 | 4/1973 |
| DE | 2232877 A1 | 1/1974 |
| DE | 2407674 A1 | 10/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3832396 A1 | 2/1990 |
| DE | 102006055478 A1 | 5/2008 |
| GB | 1464449 A | 2/1977 |
| WO | WO-2008061644 A1 | 5/2008 |
| WO | WO-08082225 A1 | 7/2008 |
| WO | WO-2011073290 A1 | 6/2011 |
| WO | WO-2011073291 A1 | 6/2011 |
| WO | WO-2013079599 A1 | 6/2013 |

OTHER PUBLICATIONS

International Search Report for PCT/EP2017/068528 dated Oct. 18, 2017.
Written Opinion of the International Searching Authority for PCT/EP2017/068528 dated Oct. 18, 2017.

* cited by examiner

*Primary Examiner* — Robert T Butcher
(74) *Attorney, Agent, or Firm* — Faegre Drinker Biddle & Reath LLP

(57) ABSTRACT

The patent application relates to compositions comprising
A) 50% to 90% by weight of at least one polymer selected from the group consisting of aromatic polycarbonate, aromatic polyestercarbonate and polyester,
B) 5% to 40% by weight of at least one rubber-modified graft polymer,
C) 1% to 20% by weight of fused silica having an average particle size $d_{50}$ of 1.0 to 10.0 μm and a content of metal oxides≤2% by weight based on component C,
D) 0% to 20% by weight of at least one additive distinct from component C,
and to the use of the compositions for the production of moulded articles, and to the moulded articles themselves.

15 Claims, No Drawings

SCRATCH-RESISTANT POLYCARBONATE COMPOSITIONS HAVING GOOD THERMAL STABILITY

CROSS-REFERENCE TO RELATED APPLICATIONS

This application is a national stage application (under 35 U.S.C. § 371) of PCT/EP2017/068528, filed Jul. 21, 2017, which claims benefit of European Application No. 16180715.1, filed Jul. 22, 2016, both of which are incorporated herein by reference in their entirety.

The present invention relates to impact-modified polycarbonate compositions, to the use of the compositions for the production of moulded articles, and to the moulded articles themselves.

BACKGROUND OF THE INVENTION

Compositions comprising polycarbonate and polymeric blend partners such as vinyl (co)polymers or polyesters are used to produce moulded articles for a great many applications, for example in the automotive sector, in the construction sector, in the electricals/electronics sector and for household appliances. By means of the precise formulation the compositions and thus also the moulded articles produced therefrom may be adapted over wide ranges in terms of their thermal, rheological and mechanical properties to the requirements of the respective application.

However, as is well known, compared to other thermoplastics such as for instance polymethyl methacrylate, polycarbonate and the moulded articles produced from polycarbonate compositions have a lower surface hardness and thus a higher sensitivity to scratching. Scratches on the component part surface are easily visible and perceived as a nuisance on high-gloss moulded articles in particular. Moulded articles made of polycarbonate compositions are therefore often provided with a scratch-resistant varnish.

However, such a surface coating entails an additional processing step and accordingly increases component part costs. Various approaches have therefore been tried to improve polycarbonate compositions per se with regard to their scratch resistance.

WO 2008/082225 A1 discloses compositions comprising 100 parts by weight of a thermoplastic (A) and 0.1 to 50 parts by weight of metal oxide nanoparticles which have a surface modified with an organic silane and are improved with regard to scratch resistance.

WO 2013/079599 A1 discloses a thermoplastic moulding material composed of polycarbonate and inorganic fillers which in addition to increased stiffness exhibits high impact strength, breaking elongation and also good scratch resistance which endures even upon processing into moulded parts having high-gloss surfaces.

CN 105176037 A discloses a polycarbonate composition comprising ABS, reinforcing additive, antioxidant and demoulding agent. The reinforcing additive comprises silica particles having a particle size of 2-4 µm. The composition features good strength, including low temperature impact strength, and heat distortion resistance.

WO 2008/061644 A discloses impact-modified compositions comprising aromatic polycarbonate and/or aromatic polyestercarbonate, rubber-modified graft polymer, hollow glass spheres, phosphorus-containing flame retardant, vinyl (co)polymer and/or polyalkylene terephthalate and additives which feature improved flowability, high stiffness and low processing shrinkage while retaining high scratch resistance.

WO 2011/073291 A1 describes flame-retarded, impact-modified and scratch-resistant polycarbonate compositions having surface-modified calcined kaolin as a filler which exhibit good mechanical properties, good flowability and high chemicals resistance.

WO 2011/073290 A1 discloses scratch-resistant and impact-modified polycarbonate compositions having good mechanical properties and high chemicals resistance. The compositions comprise a hard inorganic compound and a polyorganosiloxane silica gel compound.

None of the documents listed discloses how the scratch-resistance-improving additives affect the thermal stability of the polycarbonate compositions. Furthermore, the achieved improvement in scratch resistance, particularly for high-gloss applications, is not sufficient.

BRIEF SUMMARY OF THE INVENTION

It was therefore desirable to provide polycarbonate compositions which feature good thermal stability and from which moulded articles having a high gloss and an improved scratch resistance may be produced.

DETAILED DESCRIPTION OF THE INVENTION

It was in particular desirable to provide polycarbonate compositions featuring good gloss retention of high-gloss moulded articles after an abrasion test based on DIN EN 13300 and a high stability of the melt volume flow rate upon storage at high temperatures.

It has now been found that, surprisingly, compositions comprising

A) 50% to 90% by weight, preferably 55% to 85% by weight, particularly preferably 60% to 80% by weight, of at least one polymer selected from the group consisting of aromatic polycarbonate, aromatic polyestercarbonate and polyester, B) 5% to 40% by weight, preferably 7% to 35% by weight, particularly preferably 8% to 30% by weight, of at least one rubber-modified graft polymer, C) 1% to 20% by weight, preferably 3% to 18% by weight, particularly preferably 4 to 16% by weight, of fused silica having an average particle size $d_{50}$ of 1.0 to 10.0 µm, preferably 2.0 to 6.0 µm and particularly preferably of 3.0 to 5.0 µm and a content of metal oxides ≤2% by weight, preferably ≤1.5% by weight, particularly preferably ≤1% by weight, based on component C, D) 0% to 20% by weight, preferably 0% to 15% by weight, particularly preferably 0% to 10% by weight, of at least one additive distinct from component C, have the advantageous properties.

The % by weight values for the components A to D are based on 100% by weight of the claimed compositions.

The proportions of the components A to D are chosen such that the sum of the % by weight values of the individual components does not exceed 100% by weight.

In a particular embodiment the compositions consist of the components A to D and the proportions of the components are chosen such that the sum of the % by weight values is 100.

For some applications, for example high gloss interior component parts of automobiles, it is furthermore advantageous when the moulded articles exhibit good resistance to sun cream.

In a preferred embodiment component A comprises an aromatic polycarbonate and a polyester. When component A comprises a polyester, said polyester is preferably employed in a proportion of 15% to 50% by weight, more preferably in a proportion of 20% to 45% by weight, based on the claimed composition.

The invention also relates to scratch-resistant moulded articles having a surface gloss of at least 95 at an observation angle of 60° with a sun cream resistance rating according to BMW test specification PR551 (2014 version) with a sun cream test mixture according to DBL 7384 of at least 6. For these moulded articles scratch resistance is performed based on DIN EN 13300 on the high-gloss sheets with brush heads made of hog bristles (DIN 53778) using a dry procedure (dry abrasion) and a total of ten cycles (strokes). "Scratch-resistant moulded articles" are to be understood as meaning moulded articles which lose less than 15% gloss under these test conditions.

Component A

As component A aromatic polycarbonates, polyestercarbonates and polyesters are employed.

In one embodiment only aromatic polycarbonates are employed as component A. In a preferred embodiment mixtures of aromatic polycarbonates and polyesters are employed. When such mixtures are used then the proportion of polyesters is 15% to 50% by weight, preferably 20% to 45% by weight, based on the claimed compositions composed of the components A, B, C and D.

Aromatic polycarbonates and polyestercarbonates according to component A which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-B 1 495 626, DE-A 2 232 877, DE-A 2 703 376, DE-A 2 714 544, DE-A 3 000 610, DE-A 3 832 396; for production of aromatic polyestercarbonates, for example DE-A 3 077 934).

Aromatic polycarbonates and polyestercarbonates are produced, for example, by reacting diphenols with carbonyl halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Another possibility is production by way of a melt polymerization process via reaction of diphenols with, for example, diphenyl carbonate.

Diphenols for the production of the aromatic polycarbonates and/or aromatic polyestercarbonates are preferably those of formula (I)

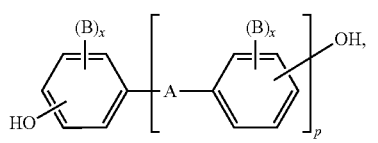

(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO_2—, $C_6$ to $C_{12}$-arylene, onto which further aromatic rings optionally comprising heteroatoms may be condensed, or a radical of formula (II) or (III)

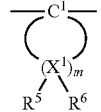

(II)

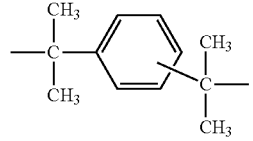

(III)

B is in each case $C_1$ to $C_{12}$-alkyl, preferably methyl, halogen, preferably chlorine and/or bromine, x is independently at each occurrence 0, 1 or 2, p is 1 or 0, and $R^5$ and $R^6$ are individually choosable for each $X^1$ and are each independently hydrogen or $C_1$ to $C_6$-alkyl, preferably hydrogen, methyl or ethyl, $X^1$ is carbon and m is a whole number from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulphide, 4,4'-dihydroxybiphenyl sulphone, and also the di- and tetrabrominated or chlorinated derivatives of these, for example 2,2-bis(3-chloro-4-hydroxyphenyl)propane, 2,2-bis(3,5-dichloro-4-hydoxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by processes known from the literature.

Examples of suitable chain terminators for the production of the thermoplastic, aromatic polycarbonates are phenol, p-chlorophenol, p-tert-butylphenol and 2,4,6-tribromophenol, and also long-chain alkylphenols, for example 4-[2-(2,4,4-trimethylpentyl)]phenol, 4-(1,3-tetramethylbutyl)phenol according to DE-A 2 842 005 and monoalkylphenols or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol.

The amount of chain terminators to be employed is generally between 0.5 mol % and 10 mol % based on the molar sum of the diphenols used in each case.

Both homopolycarbonates and copolycarbonates are suitable.

Preferred polycarbonates are not only the bisphenol A homopolycarbonates but also the copolycarbonates of bisphenol A comprising up to 15 mol %, based on the molar sums of diphenols, of other diphenols mentioned as preferred or particularly preferred, in particular 2,2-bis(3,5-dibromo-4-hydroxyphenyl)propane.

Aromatic dicarbonyl dihalides for the production of aromatic polyestercarbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyestercarbonates additionally makes concomitant use of a carbonyl halide, preferably phosgene, as a bifunctional acid derivative.

Chain terminators that can be used for the production of the aromatic polyestercarbonates are not only the above-mentioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monocarbonyl chlorides can also be used as chain terminators here.

The quantity of chain terminators in each case is from 0.1 to 10 mol %, based on moles of diphenol in the case of the phenolic chain terminators and on moles of dicarbonyl dichloride in the case of monocarbonyl chloride chain terminators.

The aromatic polyestercarbonates may also incorporate aromatic hydroxycarboxylic acids.

The aromatic polyestercarbonates may be either linear or else branched in a known manner (in this connection see DE-A 2 940 024 and DE-A 3 007 934).

Examples of branching agents that can be used are carbonyl chlorides having a functionality of three or higher, e.g. trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in quantities of from 0.01 to 1.0 mol % (based on dicarbonyl dichlorides used) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxypbenyl)propane, tetra(4-[4-hydroxyphenylisopropyl]phenoxy)methane, 1,4-bis[4,4'-dihydroxytriphenyl)methyl]benzene, in quantities of from 0.01 to 1.0 mol %, based on diphenols used. Phenolic branching agents can be used as initial charge with the diphenols, and acyl chloride branching agents can be introduced together with the acyl dichlorides.

The proportion of carbonate structural units in the thermoplastic aromatic polyestercarbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyestercarbonates may be present in the polycondensate in the form of blocks or randomly distributed.

The relative solution viscosity ($\eta_{rel}$) of the aromatic polycarbonates and polyestercarbonates is preferably in the range from 1.18 to 1.4, particularly preferably in the range from 1.20 to 1.32 (measured according to DIN 51652-1999 version on solutions of 0.5 g of polycarbonate or polyestercarbonate in 100 ml of methylene chloride at 25° C.). The weight-average molecular weight Mw of the aromatic polycarbonates and polyestercarbonates is preferably in the range from 15 to 36 kg/mol, more preferably in the range from 20 to 34 kg/mol, particularly preferably 24 to 33 kg/mol, determined by GPC (Gel Permeation Chromatography in methylene chloride with polycarbonate standard).

Polyesters suitable as a constituent of component A are in preferred embodiments aromatic and more preferably are polyalkylene terephthalates.

In particularly preferred embodiments reaction products of aromatic dicarboxylic acids or reactive derivatives thereof, such as dimethyl esters or anhydrides, and aliphatic, cycloaliphatic or araliphatic diols and also mixtures of these reaction products are concerned here.

Particularly preferred polyalkylene terephthalates comprise at least 80% by weight, preferably at least 90% by weight, based on the dicarboxylic acid component of terephthalic acid radicals and at least 80% by weight, preferably at least 90% by weight, based on the diol component of ethylene glycol and/or butane-1,4-diol radicals.

The preferred polyalkylene terephthalates may comprise, as well as terephthalic acid radicals, up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, as well as ethylene glycol and/or butane-1,4-diol radicals, up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(hydroxyethoxy)benzene, 2,2-bis(4-hydroxycyclohexyl)propane, 2,4-dihydroxy-1,1,3,3-tetramethylcyclobutane, 2,2-bis(4-j-hydroxyethoxyphenyl)propane and 2,2-bis(4-hydroxypropoxyphenyl)propane (DE-A 2 407 674, 2 407 776, 2 715 932).

The polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to polyalkylene terephthalates which have been produced solely from terephthalic acid and the reactive derivatives thereof (e.g. the dialkyl esters thereof) and ethylene glycol and/or butane-1,4-diol, and to mixtures of these polyalkylene terephthalates.

Mixtures of polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably employed polyalkylene terephthalates preferably have an intrinsic viscosity of 0.4 to 1.5 dl/g, preferably 0.5 to 1.2 dVg in the Ubbelohde viscometer measured in dichloroacetic acid in a concentration of 1% by weight at 25° C. according to DIN 53728-3. The determined intrinsic viscosity is calculated from the measured specific viscosity×0.0006907+0.063096.

It is particularly preferable when the polyester used is polybutylene terephthalate.

The particularly preferred polybutylene terephthalates have a melt flow rate measured according to DIN EN ISO 1133 at 250° C. and a loading of 2.16 kg of 9 g/10 min to 60 g/10 min.

The polyalkylene terephthalates can be produced by known methods (see, for example, Kunststoff-Handbuch [Plastics Handbook], volume VIII, p. 695 et seq., Carl-Hanser-Verlag, Munich 1973).

Component B

Component B is a rubber-modified graft polymer. Component B may further comprise rubber-free vinyl (co)polymer.

Rubber-modified vinyl (co)polymers according to component B include for example ABS polymers (emulsion, bulk and suspension ABS) as are described for example in DE-A 2035 390 (=U.S. Pat. No. 3,644,574) or in DE-A 2 248 242 (=GB Patent 1 409 275) or in Ullmanns Enzyklopädie der Technischen Chemie [Ullmann's Encyclopedia of Industrial Chemistry], Vol. 19 (1980), p. 280 et seq.

Component B comprises graft polymers produced in the emulsion polymerization process (component B1) and optionally also rubber-modified graft polymers produced in the bulk, solution or suspension polymerization process (component B2). As a consequence of production the components B1 and B2 comprise free, i.e. not bonded to the rubber substrate, vinyl (co)polymer. Rubber-free vinyl (co) polymer may also be added as a separate component (component B3).

In preferred embodiments component B consists only of B1.

In a further preferred embodiment the compositions according to the invention comprise 5% to 15% by weight of B1 based on the claimed compositions composed of the components A, B, C and D.

Component B1

Employed as component B1 are graft polymers, produced in the emulsion polymerization process, of B1.1) 5% to 95% by weight, preferably 10% to 70% by weight, particularly preferably 20% to 60% by weight, based on component B1, of a mixture of B1.1.1) 65% to 85% by weight, preferably 70% to 80% by weight, based on B1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B1.1.2) 15% to 35% by weight, preferably 20% to 30% by weight, based on B1.1, of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B1.2) 95% to 5% by weight, preferably 90% to 30% by weight, particularly preferably 80% to 40% by weight, based on component B1, of at least one elastomeric graft substrate.

The graft substrate preferably has a glass transition temperature<0° C., more preferably <−20° C., particularly preferably <−60° C.

In the context of the present patent application glass transition temperatures are determined by means of differential scanning calorimetry (DSC) according to the standard DIN EN 61006 at a heating rate of 10 K/min, with definition of the Tg as the midpoint temperature (tangent method), and nitrogen as protective gas.

In the context of the present patent application the mixture B.1.1 is also referred to as a graft superstrate of component B.1.

The graft particles in component B1 preferably have an average particle size ($d_{50}$) of 0.05 to 5 μm, preferably of 0.1 to 1.0 μm, particularly preferably of 0.2 to 0.5 μm.

The average particle size $d_{50}$ is the diameter with 50% by weight of the particles above it and 50% by weight of the particles below it. In the context of the present patent application it is determined by means of ultracentrifugation (W. Scholtan, H. Lange, Kolloid, Z. and Z. Polymere [Polymers] 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B1.1.1 styrene and B1.1.2 acrylonitrile and also B.1.1.1=B.1.2.2=methyl methacrylate.

Graft substrates B1.2 suitable for the graft polymers B1 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting to one another).

Preferred graft substrates B1.2 are diene rubbers (for example based on butadiene or isoprene), diene-vinyl block copolymer rubbers (for example based on butadiene and styrene blocks), copolymers of diene rubbers with further copolymerizable monomers (for example according to B1.1.1 and B1.1.2) and mixtures of the aforementioned rubber types. Particular preference is given to pure polybutadiene rubber and styrene-butadiene block copolymer rubber.

Graft polymers according to component B1 are preferably ABS polymers produced in the emulsion polymerization process as described for example in Ullmanns Enzyklopädie der Technischen Chemie [Ullmann's Encyclopedia of Industrial Chemistry], Vol. 19 (1980), p. 280 et seq.

It is preferable when the graft polymer composed of the components B1.1 and B1.2 has a core-shell structure, wherein component B.1 forms the shell (also described as a sheath) and component B.2 forms the core (see for example Ullmann's Encyclopedia of Industrial Chemistry, VCH-Verlag, Vol. A21, 1992, p. 635 and p. 656).

Particularly suitable graft rubbers also include ABS polymers produced in the emulsion polymerization process by redox initiation with an initiator system of organic hydroperoxide and ascorbic acid according to U.S. Pat. No. 4,937,285.

Further particularly suitable graft polymers B1 are MBS modifiers having a core-shell structure.

The gel content of the graft polymers is at least 40% by weight, preferably at least 60% by weight, more preferably at least 75% by weight (measured in acetone).

The gel content of the graft polymers is, unless stated otherwise in the present invention, determined at 25° C. as the insoluble fraction in acetone as the solvent (M. Hoffmann, H. Kromer, R. Kuhn, Polymeranalytik I und II [Polymer Analysis I and II], Georg Thieme-Verlag, Stuttgart 1977).

The graft polymers B1 are produced by free-radical polymerization.

The graft polymer B1 generally comprises as a consequence of production free, i.e. not chemically bonded to the rubber substrate, copolymer of B1.1.1 and B1.1.2 which has the feature that it can be dissolved in suitable solvents (e.g. acetone).

Component B1 preferably comprises a free copolymer of B1.1.1 and B1.1.2 which has a weight-average molecular weight (Mw) determined by gel permeation chromatography in tetrahydrofuran with a polystyrene standard of 20 to 180 kg/mol, preferably 30 to 150 kg/mol, particularly preferably of 40 to 140 kg/mol.

Component B2

As component B2 the compositions according to the invention may optionally comprise rubber-modified graft polymers produced in the bulk, solution or suspension polymerization process. These are graft polymers of B2.1) 5% to 95% by weight, preferably 80% to 93% by weight, particularly preferably 85% to 92% by weight, very particularly preferably 87% to 93% by weight, based on component B2, of a mixture of B2.1.1) 65% to 85% by weight, preferably 70% to 80% by weight, based on the mixture B2.1 of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate) and B2.1.2) 15% to 35% by weight, preferably 20% to 30% by weight, based on the mixture B2.1 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B2.2) 95% to 5% by weight, preferably 20% to 7% by weight, particularly preferably 15% to 8% by weight, very particularly preferably 13% to 7% by weight, based on component B2, of at least one graft substrate.

The graft substrate preferably has a glass transition temperature<0° C., preferably <−20° C., particularly preferably <−60° C.

In the context of the present patent application the mixture B.2.1 is also referred to as a graft superstrate of component B.2.

The graft particles in component B2 preferably have an average particle size (D50) of 0.1 to 10 m, preferably of 0.2 to 2 μm, particularly preferably of 0.3 to 1.0 μm, very particularly preferably of 0.3 to 0.9 μm.

Preferred monomers B2.1.1 are selected from at least one of the monomers styrene, α-methylstyrene and methyl methacrylate; preferred monomers B2.1.2 are selected from at least one of the monomers acrylonitrile, maleic anhydride and methyl methacrylate.

Particularly preferred are B2.1.1 styrene and B2.1.2 acrylonitrile.

Graft substrates B2.2 suitable for the graft polymers B2 are, for example, diene rubbers, diene-vinyl block copolymer rubbers, EP(D)M rubbers, i.e. those based on ethylene/propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting to one another).

Preferred graft substrates B2.2 are diene rubbers (for example based on butadiene or isoprene), diene-vinyl block copolymer rubbers (for example based on butadiene and styrene blocks), copolymers of diene rubbers with further copolymerizable monomers (for example according to B2.1.1 and B2.1.2) and mixtures of the aforementioned rubber types. Particularly preferred graft substrates B2.2 are styrene-butadiene block copolymer rubbers and mixtures of styrene-butadiene block copolymer rubbers with pure polybutadiene rubber.

The gel content of the graft polymers B2 is preferably 10% to 35% by weight, particularly preferably 15% to 30% by weight, very particularly preferably 17% to 23% by weight (measured in acetone).

Particularly preferred polymers B2 are for example ABS polymers produced by free-radical polymerization which in preferred embodiments contain up to 10% by weight, particularly preferably up to 5% by weight, particularly preferably 2% to 5% by weight, of n-butyl acrylate in each case based on the graft polymer B2.

The graft polymer B2 generally comprises as a consequence of production free, i.e. not chemically bonded to the rubber substrate, copolymer of B2.1.1 and B2.1.2 which has the feature that it can be dissolved in suitable solvents (e.g. acetone).

Component B2 preferably comprises free copolymer of B2.1.1 and B2.1.2 which has a weight-average molecular weight (Mw) determined by gel permeation chromatography in tetrahydrofuran with a polystyrene standard of preferably 50 to 200 kg/mol, particularly preferably of 70 to 150 kg/mol, particularly preferably of 80 to 140 kg/mol.

Component B3

The composition may optionally comprise as a further component B3 (co)polymers of at least one monomer from the group of the vinylaromatics, vinyl cyanides (unsaturated nitriles), (C1 to C8)alkyl (meth)acrylates, unsaturated carboxylic acids and derivatives (such as anhydrides and imides) of unsaturated carboxylic acids.

Especially suitable as component B3 are (co)polymers of B3.1 50% to 99% by weight, preferably 65% to 85% by weight, particularly preferably 70% to 80% by weight based on the (co)polymer B3 of at least one monomer selected from the group of the vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate) and B3.2 1% to 50% by weight, preferably 15% to 35% by weight, particularly preferably 20% to 30% by weight based on the (co)polymer B3 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B3 are resinous, thermoplastic and rubber-free. Particular preference is given to the copolymer of B3.1 styrene and B3.2 acrylonitrile.

(Co)polymers B3 of this kind are known and can be produced by free-radical polymerization, especially by emulsion, suspension, solution or bulk polymerization.

The (co)polymers B3 have a weight-average molecular weight (Mw) determined by gel permeation chromatography in tetrahydrofuran with a polystyrene standard of preferably 50 to 200 kg/mol, particularly preferably of 70 to 150 kg/mol, particularly preferably of 80 to 140 kg/mol.

Component C

As component C the thermoplastic moulding materials comprise an inorganic filler which is made up to an extent of over 98% by weight of silicon dioxide (quartz). Preferred components C are finely divided fused silica flours produced from electrically molten silicon dioxide by iron-free grinding with subsequent wind sifting.

Particularly preferred fused silica is characterized in that the content of metal oxides does not exceed 2% by weight, preferably 1.5% by weight, particularly preferably 1% by weight, wherein preferably the content of $Al_2O_3$ is ≤1% by weight, preferably ≤0.6% by weight, particularly preferably ≤0.3% by weight, $Fe_2O_3$ is ≤0.1% by weight, preferably ≤0.06% by weight, particularly preferably ≤0.03% by weight, CaO+MgO is ≤0.1% by weight, preferably ≤0.06% by weight, particularly preferably ≤0.03% by weight and $Na_2O+K_2O$ is ≤0.1% by weight, preferably ≤0.06% by weight, particularly preferably ≤0.03% by weight in each case based on the total weight of the fused silica flour.

In a particular embodiment the fused silica is characterized in that the content of $Al_2O_3$ is 0.01% to 1% by weight, preferably 0.05% to 0.6% by weight, particularly preferably 0.1% to 0.3% by weight.

In a particular embodiment the fused silica is characterized in that the content of $Fe_2O_3$ is 0.001% to 0.1% by weight, preferably 0.005% to 0.06% by weight, particularly preferably 0.01% to 0.03% by weight.

In a particular embodiment the fused silica is characterized in that the content of CaO+MgO is 0.001% to 0.1% by weight, preferably 0.005% to 0.06% by weight, particularly preferably 0.01% to 0.03% by weight.

In a particular embodiment the fused silica is characterized in that the content of $Na_2O+K_2O$ is 0.001% to 0.1% by weight, preferably 0.005% to 0.06% by weight, particularly preferably 0.01% to 0.03% by weight It is advantageous and thus preferable to especially employ the fused silica flour according to the invention having an average particle size $d_{50}$ of 1.0 to 10.0 µm, preferably 2.0 to 6.0 µm and particularly preferably of 3.0 to 5.0 µm.

The average particle size $d_{50}$ is the diameter with 50% by weight of the particles above it and 50% by weight of the particles below it. It can be determined by ultracentrifugation (W. Scholtan, H. Lange, Kolloid, Z. and Z. Polymere [polymers] 250 (1972), 782-1796). The fused silica to be used according to the invention preferably has an upper particle/grain size $d_{90}$ below 100 µm, preferably below 50 µm, particularly preferably below 20 µm and especially preferably below 15 µm. The upper particle/grain size $d_{90}$ describes the size which 90% of the particles/grains do not exceed.

The fused silica flour preferably has a specific BET surface area determined by nitrogen adsorption according to ISO 9277 (2010 version) of 0.6 to 10.0 m²/g, more preferably of 2.0 to 8.0 m²/g and particularly preferably of 5.0 to 7.0 m²/g.

Especially preferred are those fused silica flours having a pH, measured according to ISO 10390 (2005 version) in aqueous suspension in the range from 5.0 to 8.0, preferably 5.5 to 7.0. They further have an oil absorption number according to ISO 787-5 (1995 version) of preferably 20 to 30 g/100 g.

Component D

The compositions may comprise as component D at least one additive distinct from component C, preferably selected from the group consisting of flame retardants (for example organic phosphorus or halogen compounds, in particular bisphenol-A-based oligophosphate), anti-drip agents (for example compounds from the classes of fluorinated polyolefins, silicones, and also aramid fibres), flame retardant synergists (for example nanoscale metal oxides), smoke inhibitors (for example zinc borate), lubricants and demoulding agents (for example pentaerythritol tetrastearate), nucleating agents, antistats, conductivity additives, stabilizers (e.g. hydrolysis, heat-ageing and UV stabilizers, and also transesterification inhibitors and acid/base quenchers), flow promoters, compatibilizers, further impact modifiers distinct from component B (with or without core-shell structure), further polymeric constituents (for example functional blend partners), fillers and reinforcers (for example carbon fibres, talc, mica, kaolin, CaCO) and also dyes and pigments (for example titanium dioxide or iron oxide).

In preferred embodiments the compositions are free from flame retardants, anti-drip agents, flame retardant synergists and smoke inhibitors.

In preferred embodiments the compositions comprise at least one polymer additive selected from the group consisting of lubricants and demoulding agents, stabilizers, flow promoters, compatibilizers, further impact modifiers distinct from component B, further polymeric constituents, dyes and pigments.

In preferred embodiments the compositions comprise at least one polymer additive selected from the group consisting of lubricants/demoulding agents and stabilizers.

In preferred embodiments the compositions comprise pentaerythritol tetrastearate as a demoulding agent.

In preferred embodiments the compositions comprise as a stabilizer at least one representative selected from the group consisting of sterically hindered phenols, organic phosphites, sulphur-based co-stabilizers and organic and inorganic Brønsted acids.

In particularly preferred embodiments the compositions comprise as a stabilizer at least one representative selected from the group consisting of octadecyl 3-(3,5-di-tert-butyl-4-hydroxyphenyl)propionate, tris(2,4-di-tert-butylphenyl)phosphite and phosphorous acid.

Further embodiments 1 to 43 of the present invention are described below:

1. Compositions comprising or consisting of
    A) 50% to 90% by weight of at least one polymer selected from the group consisting of aromatic polycarbonate, aromatic polyestercarbonate and polyester,
    B) 5% to 40% by weight of at least one rubber-modified graft polymer or a mixture of rubber-modified graft polymer and rubber-free vinyl (co)polymer,
    C) 1% to 20% by weight of fused silica having an average particle size $d_{50}$ of 1.0 to 10.0 µm and a content of metal oxides≤2% by weight based on component C,
    D) 0% to 20% by weight of an additive distinct from component C or a plurality of additives distinct from component C.

2. Compositions according to embodiment 1, wherein component A comprises an aromatic polycarbonate based on bisphenol A having a weight-average molar mass Mw of 24 kg/mol to 33 kg/mol.

3. Compositions according to either of the preceding embodiments, wherein component B comprises a graft polymer produced in the emulsion polymerization process with a butadiene rubber as the graft substrate and a graft superstrate made of methyl methacrylate or a styrene-acrylonitrile copolymer.

4. Compositions according to any of the preceding embodiments, wherein component C has a content of metal oxides≤1% by weight based on component C.

5. Compositions according to any of the preceding embodiments, wherein component C has a content of aluminium oxide of ≤1% by weight based on component C.

6. Compositions according to any of the preceding embodiments, wherein component C has a content of aluminium oxide of 0.05% to 0.6% by weight based on component C.

7. Compositions according to any of the preceding embodiments, wherein component C has a content of aluminium oxide of 0.3% by weight based on component C.

8. Compositions according to any of the preceding embodiments, wherein component C has an $Fe_2O_3$ content of ≤0.1% by weight based on component C.

9. Compositions according to any of the preceding embodiments, wherein component C has an $Fe_2O_3$ content of 0.005% to 0.06% by weight based on component C.

10. Compositions according to any of the preceding embodiments, wherein component C has an $Fe_2O_3$ content of ≤0.03% by weight based on component C.

11. Compositions according to any of the preceding embodiments, wherein component C has a CaO+MgO content of ≤0.1% by weight based on component C.

12. Compositions according to any of the preceding embodiments, wherein component C has a CaO+MgO content of 0.005% to 0.06% by weight based on component C.

13. Compositions according to any of the preceding embodiments, wherein component C has a CaO+MgO content of ≤0.03% by weight based on component C.

14. Compositions according to any of the preceding embodiments, wherein component C has an $Na_2O+K_2O$ content of ≤0.1% by weight based on component C.

15. Compositions according to any of the preceding embodiments, wherein component C has an $Na_2O+K_2O$ content of 0.005% to 0.06% by weight based on component C.

16. Compositions according to any of the preceding embodiments, wherein component C has an $NaO+K_2O$ content of ≤0.03% by weight based on component C.

17. Compositions according to any of the preceding embodiments, wherein component C has an average particle size $d_{50}$ of 3 to 5 μm.

18. Compositions according to any of the preceding embodiments, wherein component C has an upper particle size $d_{90}$ of less than 15 μm.

19. Compositions according to any of the preceding embodiments, wherein component C has a pH measured according to DIN ISO 10390 of 5.0 to 8.0.

20. Compositions according to any of the preceding embodiments, wherein component C has a pH measured according to DIN ISO 10390 of 5 to 6.5.

21. Compositions according to any of the preceding embodiments, wherein component C has a specific BET surface area determined by nitrogen adsorption according to ISO 9277 of 2.0 to 8.0 m²/g.

22. Compositions according to any of the preceding embodiments, wherein component C has a specific BET surface area determined by nitrogen adsorption according to ISO 9277 of 5.0 to 7.0 m²/g.

23. Compositions according to any of the preceding embodiments, wherein component C has an oil absorption number according to ISO 787-5-1995 version of 20 to 30 g/100 g.

24. Compositions according to any of the preceding embodiments, wherein component A comprises only aromatic polycarbonate and component B comprises a rubber-modified graft polymer produced in emulsion polymerization (component B1) and at least one polymer selected from rubber-modified graft polymer produced in the bulk, solution or suspension polymerization process (component B2) and rubber-free vinyl (co)polymer (component B3).

25. Compositions according to embodiment 24, wherein the ratio of B1 to B2+B3 is at least 2:1.

26. Compositions according to embodiment 24, wherein the ratio of B1 to B2+B3 is at least 3:1.

27. Compositions according to any of embodiments 1 to 23, wherein component A comprises aromatic polycarbonate and polyalkylene terephthalate or a mixture of a plurality of polyalkylene terephthalates and component B consists only of rubber-modified graft polymer produced in emulsion polymerization.

28. Compositions according to embodiment 27, wherein the polyalkylene terephthalate used is polybutylene terephthalate.

29. Compositions according to any of embodiments 1 to 23 and 27 to 28, wherein the polyester is present in a proportion of 15% to 50% by weight based on the claimed composition.

30. Compositions according to embodiment 29, wherein the polyester is present in a proportion of 20% to 45% by weight based on the claimed composition.

31. Compositions according to any of the preceding embodiments, comprising 55% to 85% by weight of component A.

32. Compositions according to any of the preceding embodiments, comprising 60% to 80% by weight of component A.

33. Compositions according to any of the preceding embodiments, comprising 7% to 35% by weight of component B.

34. Compositions according to any of the preceding embodiments, comprising 8% to 30% by weight of component B.

35. Compositions according to any of the preceding embodiments, comprising 5% to 15% by weight of rubber-modified graft polymer produced in emulsion polymerization (component B1).

36. Compositions according to any of the preceding embodiments, comprising 3% to 18% by weight of component C.

37. Compositions according to any of the preceding embodiments, comprising 4% to 16% by weight of component C.

38. Compositions according to any of the preceding embodiments, wherein component D is at least one additive selected from flame retardants, anti-drip agents, smoke inhibitors, lubricants and demoulding agents, nucleating agents, antistats, conductivity additives, stabilizers, flow promoters, compatibilizers, further impact modifiers distinct from component B, further polymeric constituents, fillers and reinforcers and also dyes and pigments.

39. Compositions according to any of the preceding embodiments, comprising 0% to 15% by weight of component D.

40. Compositions according to any of the preceding embodiments, comprising 0% to 10% by weight of component D.

41. Compositions according to any of the preceding embodiments, consisting of components A to D.

42. Use of compositions according to any of embodiments 1 to 41 for producing moulded articles.

43. Moulded articles obtainable from compositions according to any of embodiments 1 to 41.

Moulding materials can be produced from the compositions according to the invention comprising the components A to D. To this end the components are mixed in known fashion and melt compounded or melt extruded at temperatures of 200° C. to 330° C. in customary assemblies such as internal mixers, extruders and twin-screw machines.

The compositions (moulding materials) produced by the process according to the invention may be used for producing moulded articles of any kind. These may be produced by injection moulding, extrusion and blow-moulding processes for example. Another type of processing is the production of moulded articles by thermoforming from prefabricated sheets or films.

Examples of such moulded articles are films, profiles, housing parts of any type, e.g. for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions according to the invention are also suitable for the production of the following moulded articles or moulded parts: Internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

The compositions according to the invention are particularly suitable for producing high-gloss interior and exterior parts for automobiles and rail vehicles.

Another form of processing is production of moulded articles by blow-moulding or by thermoforming from previously produced sheets or films.

The invention accordingly also provides for the use of the compositions according to the invention for producing moulded articles as well as moulded articles or moulded parts of any kind whatsoever obtainable from the compositions according to the invention.

EXAMPLES

Component A-1:
Linear polycarbonate based on bisphenol A having a weight-average molecular weight Mw of 25 kg/mol (determined by GPC in methylene chloride with polycarbonate standards).

Component A-2:
Linear polycarbonate based on bisphenol A having a weight-average molecular weight Mw of 32 kg/mol (determined by GPC in methylene chloride with polycarbonate standards).

Component A-3:
Polybutylene terephthalate (Pocan™ B1600, Lanxess AG) having a melt volume flow rate (MVR) of 14 $cm^3$/10 min measured at 260° C./2.16 kg (ISO 1133).

Component A-4:
Polybutylene terephthalate (Pocan™ B1300, Lanxess AG) having a melt volume flow rate (MVR) of 45 $cm^3$/10 min measured at 250° C./2.16 kg (ISO 1133).

Component B-1:
Acrylonitrile-butadiene-styrene (ABS) polymer produced in the emulsion polymerization process having an acrylonitrile:butadiene:styrene weight ratio of 12:57:31% by weight and an average particle size $d_{50}$ of the graft substrate of 340 nm determined by ultracentrifugation.

Component B-2:
Impact modifier having a core/shell structure; core: polybutadiene, shell: polymethyl methacrylate (Paraloid™ EXL 2690, Dow).

Component B-3:
Acrylonitrile-butadiene-styrene (ABS) polymer produced in the emulsion polymerization process having an A:B:S ratio of 19:25:56. The average rubber particle size $d_{50}$, measured by ultracentrifugation, is 0.25 μm. Component B3 comprises free copolymer of styrene and acrylonitrile which has a weight-average molecular weight (Mw) determined by gel permeation chromatography with a polystyrene standard of 130 kg/mol.

Component B-4:
Acrylonitrile-butadiene-styrene (ABS) polymer produced in the bulk polymerization process having an A:B:S ratio of 23:10:67% by weight. The average rubber particle size $d_{50}$, measured by ultracentrifugation, is 0.85 μm. Component B3 comprises free copolymer of styrene and acrylonitrile which has a weight-average molecular weight (Mw) determined by gel permeation chromatography with a polystyrene standard of 125 kg/mol.

Component B-5:
Styrene-acrylonitrile copolymer having an acrylonitrile content of 23% by weight and a weight-average molecular weight of about 130 kg/mol (determined by GPC in tetrahydrofuran with a polystyrene standard).

Component C-1:
Amosil™ FW600 fused silica flour (silicon dioxide) from Quarzwerke GmbH having an average particle size of $d_{50}$=4.0 μm (unsized), a total content of metal oxides of <1% by weight and a content of $Al_2O_3$ of 0.3 wt %. In aqueous dispersion the fused silica has a pH of 6 measured according to ISO 10390. The fused silica flour has a specific BET surface area determined by nitrogen adsorption according to ISO 9277 (2010 version) of 6.0 $m^2$/g.

Component C-2:
Zeeospheres™ W-210 alkali aluminosilicate ceramic microspheres from 3M Deutschland GmbH (Energy and Advanced Material Division) having an average particle size of $d_{50}$=3.0 μm.

Component C-3:
Burgess CB™ vinylsilane-modified calcined kaolin (aluminium silicate) from Burgess Pigment Company (USA) having an average particle size of 1.5 μm.

Component C-4:
Silfit™ Z91, a mixture of amorphous and cryptocrystalline silica and lamellar kaolinite that has been subjected to a thermal treatment (calcined) having an average particle size of $d_{50}$=3.0 μm (Hofmann Mineral, Germany) and an $SiO_2$ content of 86% by weight and an $Al_2O_3$ content of 12% by weight.

Component D-1:

Irganox™ 1076 (2,6-di-tert-butyl-4-(octadecanoxycarbonylethyl)phenol), BASF (Ludwigshafen, Germany).

Component D-2:

Phosphorous esters of bis(2-hydroxy-3-cyclohexyl-5-methylphenyl)methane, commercially available from Rhein Chemie Rheinau GmbH as Addovate ThermoStab.

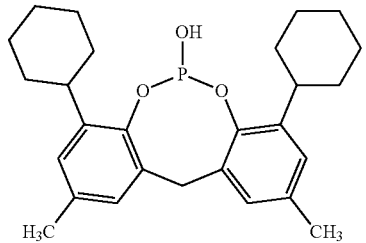 [SMILES: Cc1cc2c(c(C3CCCCC3)c1)OP(O)Oc1c(cc(C)cc1C1CCCCC1)C2]

Component D-3:

Phosphorous acid (Sigma-Aldrich Chemie GmbH).

Component D-4:

Tinuvin™ 360 UV Stabilizer (BASF). 2,2'-Methylenebis[6-(2H-benzotriazol-2-yl)-4-(1,1,3,3-tetramethylbutyl)phenol].

Component D-S:

Loxiol™ P 861/3.5 Special pentaerythritol tetrastearate (Emery Oleochemicals GmbH).

Component D-6:

Jetfine™ 3CA talc from Imerys Talc (USA) having an MgO content of 32% by weight, an $SiO_2$ content of 61% by weight and an $Al_2O_3$ content of 0.3% by weight, average particle size $d_{50}$=1.0 μm.

Component D-7:

Black Pearls™ carbon black (Cabot Corporation).

Production and Testing of the Moulding Materials of the Invention

The components were mixed in a ZSK-25 twin-screw extruder from Werner & Pfleiderer at a melt temperature of 260° C. The moulded articles were produced at a melt temperature of 260° C. and a mould temperature of 150° C. (table 1, examples 1-7) or 110° C. (table 2, examples 8-14) by means of variothermal injection moulding technology (Rapid Heat Cycle Moulding (RHCM)) on an Arburg 270 E injection-moulding machine.

The employed measure for the thermal stability of the composition was the change in MVR (in %) measured according to ISO 1133 (2012 version) at 260° C. with a piston loading of 5 kg during a 15 minute exposure to thermal stress at 300° C. (table 1, examples 1-7) and during a 15 minute exposure to thermal stress at 260° C. (table 2, examples 8-10, 12-13).

The scour resistance test was performed based on DIN EN 13300 (2001 version) using a (PB-5000) abrasion testing device from BYK-Gardner. The abrasion resistance was performed on the high-gloss sheets (160×110×3 mm, obtained by RHCM) with brush heads made of hog bristles (DIN 53778) using a dry procedure (dry abrasion) and a total of ten cycles (strokes). "Based on" is to be understood as meaning that in a departure from the standard a dry procedure (dry abrasion) was used and ten cycles (strokes) were performed. The gloss was then measured. The employed measure for scratch resistance was the change in gloss (in %) measured using a gloss measuring instrument (reflectometer) from BYK-Gardner at a measurement angle of 600.

Sun cream resistance was performed according to BMW test specification PR551 (2014 version) with a sun cream test mixture according to DBL 7384. The test specimen (high-gloss sheet) was exposed to the test cream by droplet application, wherein the size of the droplet had a diameter of a 7-10 mm. The test specimen was then stored in the heating oven at 60±2° C. for 24 h. The test specimens were stored horizontally and the droplets were arranged at a distance of at least 12 mm from the specimen edges. Evaluation was by visual means according to the criteria of the test specification. The evaluation index of 4 denotes a marked optical imperfection after the test, the evaluation number 7 corresponds to a slight alteration after the test. Completely unchanged surfaces are evaluated with the indices 9 and 10.

TABLE 1

|  | 1 (comp.) | 2 | 3 | 4 (comp.) | 5 (comp.) | 6 (comp.) | 7 (comp.) |
|---|---|---|---|---|---|---|---|
| Components [% by weight] | | | | | | | |
| A-1 | 69.91 | 66.60 | 63.58 | 66.60 | 63.58 | 63.58 | 63.58 |
| B-1 | 2.99 | 2.84 | 2.71 | 2.84 | 2.71 | 2.71 | 2.71 |
| B-3 | 18.65 | 17.76 | 16.96 | 17.76 | 16.96 | 16.96 | 16.96 |
| B-4 | 3.94 | 3.75 | 3.58 | 3.75 | 3.58 | 3.58 | 3.58 |
| B-5 | 2.99 | 2.84 | 2.71 | 2.84 | 2.71 | 2.71 | 2.71 |
| C-1 | | 4.74 | 9.05 | | | | |
| C-2 | | | | 4.74 | 9.05 | | |
| C-3 | | | | | | 9.05 | |
| C-4 | | | | | | | 9.05 |
| D-1 | 0.20 | 0.19 | 0.18 | 0.19 | 0.18 | 0.18 | 0.18 |
| D-2 | 0.10 | 0.09 | 0.09 | 0.09 | 0.09 | 0.09 | 0.09 |
| D-5 | 0.74 | 0.70 | 0.67 | 0.70 | 0.67 | 0.67 | 0.67 |
| D-7 | 0.50 | 0.47 | 0.45 | 0.47 | 0.45 | 0.45 | 0.45 |
| Properties | | | | | | | |
| Starting gloss 60° | 107 | 106 | 107 | 106 | 106 | 107 | 107 |
| Reduction in gloss 60° [%] | 32 | 12 | 8 | — | 11 | 12 | 10 |
| Thermal stability MVR (5 min → 15 min) [%] | 38 | 31 | 37 | 96 | 187 | 176 | 68 |
| Sun cream resistance Visual evaluation | 4 | — | 4 | — | 4 | 4 | 4 |

TABLE 2

Moulding materials and properties thereof

| | 8 (comp.) | 9 | 10 | 11 | 12 (comp.) | 13 (comp.) | 14 (comp.) |
|---|---|---|---|---|---|---|---|
| Components [% by weight] | | | | | | | |
| A-2 | 48.52 | 46.05 | 43.58 | 41.11 | 46.05 | 43.58 | 41.11 |
| A-3 | 29.84 | 28.32 | 26.81 | 25.29 | 28.32 | 26.81 | 25.29 |
| A-4 | 9.95 | 9.44 | 8.93 | 8.43 | 9.44 | 8.93 | 8.43 |
| B-2 | 9.95 | 9.44 | 8.93 | 8.43 | 9.44 | 8.93 | 8.43 |
| C-1 | | 5.00 | 10.01 | 15.01 | | | |
| C-2 | | | | | | 10.01 | 15.01 |
| D-1 | 0.10 | 0.10 | 0.10 | 0.10 | 0.10 | 0.10 | 0.10 |
| D-3 | 0.03 | 0.03 | 0.03 | 0.03 | 0.03 | 0.03 | 0.03 |
| D-4 | 0.20 | 0.20 | 0.20 | 0.20 | 0.20 | 0.20 | 0.20 |
| D-5 | 0.80 | 0.80 | 0.80 | 0.80 | 0.80 | 0.80 | 0.80 |
| D-6 | 0.10 | 0.10 | 0.10 | 0.10 | 0.10 | 0.10 | 0.10 |
| D-7 | 0.50 | 0.50 | 0.50 | 0.50 | 0.50 | 0.50 | 0.50 |
| Properties | | | | | | | |
| Starting gloss 60° | 100 | 98 | 99 | 100 | 95 | 98 | 98 |
| Reduction in gloss 60° [%] | 45 | 14 | 12 | 11 | 30 | 26 | 24 |
| Thermal stability MVR (5 min → 15 min) [%] | 19 | 17 | 26 | — | 29 | 50 | — |
| Sun cream resistance Visual evaluation | 7 | — | 7 | — | — | 7 | — |

It is apparent from tables 1 and 2 that only the compositions comprising fused silica as the inorganic filler solve the problem addressed by the invention, i.e. only the inventive compositions according to examples 2 and 3 (table 1) and the inventive compositions according to examples 9-11 (table 2) exhibit a combination of higher thermal processing stability and higher scratch resistance. In addition the inventive example 10 shows improved sun cream resistance.

The invention claimed is:

1. Compositions comprising
   A) 50% to 90% by weight of at least one aromatic polycarbonate,
   B) 5% to 40% by weight of at least one rubber-modified graft polymer produced in emulsion polymerization (component B1) and at least one polymer selected from rubber-modified graft polymer produced in the bulk, solution or suspension polymerization process (component B2) and rubber-free vinyl (co)polymer (component B3), wherein the ratio of B1 to B2+B3 is at least 2:1, and wherein component B comprises a graft polymer produced in the emulsion polymerization process with a butadiene rubber as the graft substrate and a graft superstrate made of methyl methacrylate or a styrene-acrylonitrile copolymer;
   C) 1% to 20% by weight of fused silica having an average particle size $d_{50}$ of 1.0 to 10.0 µm and a content of metal oxides ≤1% by weight based on component C,
   D) 0% to 20% by weight of at least one additive distinct from component C.

2. Compositions according to claim 1, wherein component A comprises an aromatic polycarbonate based on bisphenol A having a weight-average molar mass $M_w$ of 24 kg/mol to 33 kg/mol.

3. Compositions according to claim 1, wherein component C has a content of aluminium oxide of ≤1% by weight.

4. Compositions according to claim 1, wherein component C has an $Fe_2O_3$ content of ≤0.1% by weight.

5. Compositions according to claim 1, wherein component C has an average particle size $d_{50}$ of 3 to 5 µm.

6. Compositions according to claim 1, wherein component C has a pH measured according to DIN ISO 10390 of 5 to 6.5.

7. Compositions according to claim 1, wherein component C has a specific BET surface area determined by nitrogen adsorption according to ISO 9277 of 2.0 to 8.0 $m^2/g$.

8. Compositions according to claim 1, wherein component A comprises only aromatic polycarbonate and component B comprises a rubber-modified graft polymer produced in emulsion polymerization and at least one polymer selected from rubber-modified graft polymer produced in the bulk, solution or suspension polymerization process and rubber-free vinyl (co)polymer.

9. Compositions according to claim 1, wherein component A comprises aromatic polycarbonate and polyalkylene terephthalate or a mixture of a plurality of polyalkylene terephthalates and component B consists only of rubber-modified graft polymer produced in emulsion polymerization.

10. Compositions according to claim 9, wherein the polyalkylene terephthalate used is polybutylene terephthalate.

11. Compositions according to claim 1, wherein the polyester is present in a proportion of 20% to 45% by weight based on the claimed compositions.

12. Compositions according to claim 1 comprising 5 to 15% by weight of rubber-modified graft polymer produced in emulsion polymerization.

13. Use of compositions according to claim 1 for the production of moulded articles.

14. Moulded articles obtainable from compositions according to claim 1.

15. A composition comprising
   A) 50% to 90% by weight of at least one polymer selected from the group consisting of aromatic polycarbonate, aromatic polyestercarbonate and polyester, wherein component A comprises aromatic polycarbonate and polyalkylene terephthalate or a mixture of a plurality of polyalkylene terephthalates, wherein the polyester is present in a proportion of 20% to 45% by weight based on the claimed compositions, B) 5% to 40% by weight of at least one rubber-modified graft polymer, wherein component B comprises 5 to 15% by weight of a graft polymer produced in the emulsion polymerization process with a butadiene rubber as the graft substrate and a graft superstrate made of methyl methacrylate or a styrene-acrylonitrile copolymer, C) 1% to 20% by weight of fused silica having an average particle size $d_{50}$ of 1.0 to 10.0 μm and a content of metal oxides≤1% by weight based on component C, D) 0% to 20% by weight of at least one additive distinct from component C.

* * * * *